Jan. 3, 1939. F. W. BLETHEN 2,142,602
PHOTOELECTRIC SPEED LIMIT INDICATOR
Filed May 16, 1936
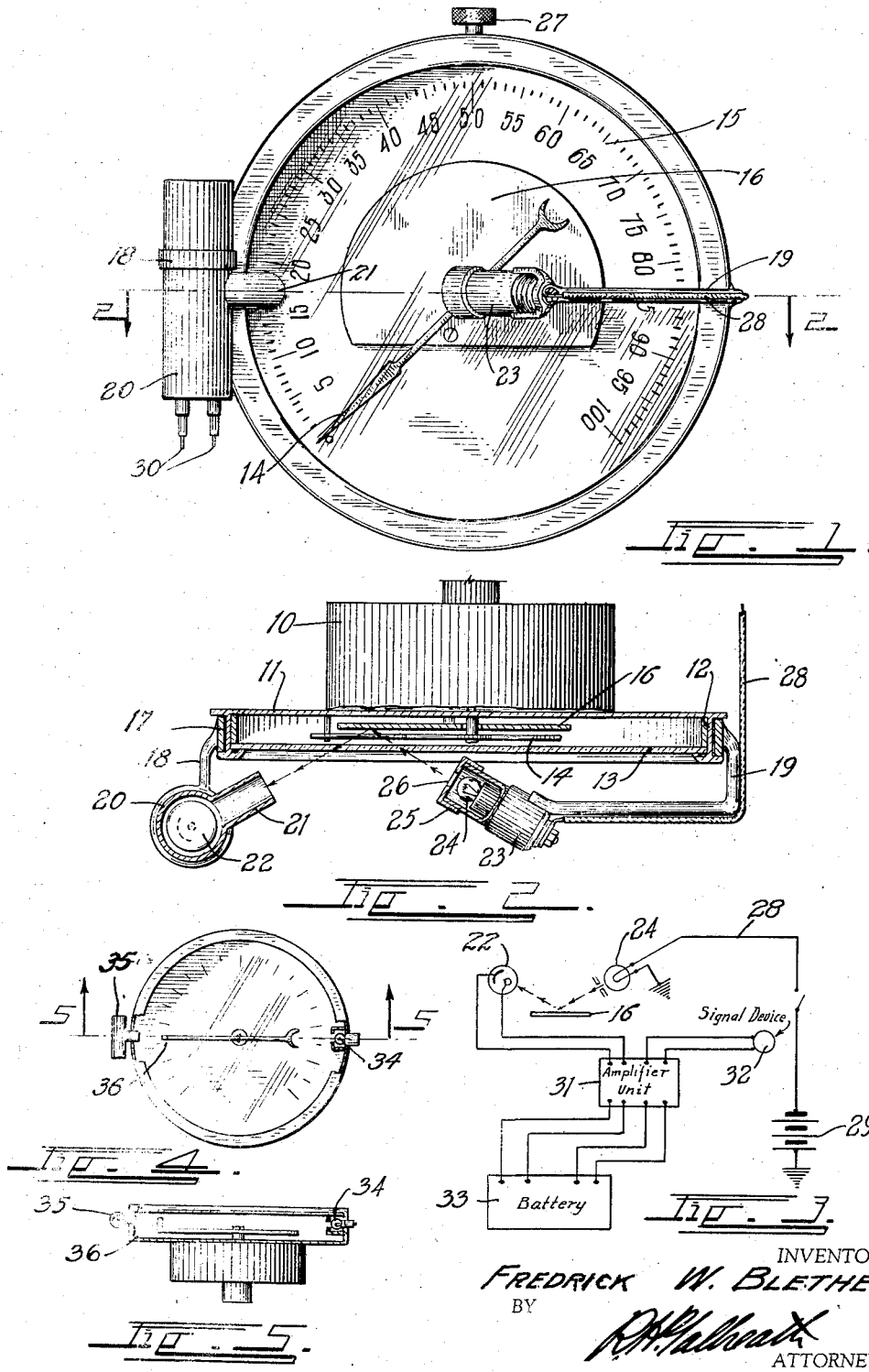
INVENTOR.
FREDRICK W. BLETHEN
BY
ATTORNEY.

Patented Jan. 3, 1939

2,142,602

UNITED STATES PATENT OFFICE 2,142,602

PHOTOELECTRIC SPEED LIMIT INDICATOR

Fredrick W. Blethen, Denver, Colo.

Application May 16, 1936, Serial No. 80,132

12 Claims. (Cl. 250—41.5)

This invention relates to an attachment for an automotive speedometer for giving a signal when the indicating hand thereon has reached certain predetermined position. While the invention is particularly applicable to an automobile speedometer for giving an indication to the driver when a certain speed has been reached, it is not of course limited to this particular use but will be found valuable upon any indicating instrument having a movable hand for giving an indication upon a dial index.

The principal object of the invention is to provide a highly efficient mechanism which can be applied to the face of a speedometer without interfering with the speedometer mechanism and without imparting any drag or other resistance to the normal operation of the speedometer and yet which will give a positive indication when any desired point is reached by the speedometer hand.

Another object of the invention is to accomplish the above without the use of mechanical contacts of any nature which would interfere with the accurate and delicate movement of the indicating hand.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a face view of a typical automobile speedometer with the invention applied thereto.

Fig. 2 is a horizontal section through the face of the speedometer of Fig. 1, taken on the line 2—2, Fig. 1.

Fig. 3 is a typical circuit diagram illustrating the electrical connections to the indicating portion of the device.

Fig. 4 is a face view of a second speedometer illustrating an alternate form of the device.

Fig. 5 is a section through the face of the alternate form of Fig. 4, taken on the line 5—5, Fig. 4.

A typical speedometer mechanism is indicated at 10 with its dial at 11. In the present day speedometers, the dial 11 is usually of much greater diameter than the speedometer mechanism 10 and projects beyond the latter as shown in Fig. 2. The speedometer dial is provided with a rim flange 12 holding the lens or glass cover plate 13. The speedometer is of course provided with the usual indicating hand 14 for indicating positions on a dial index 15. Thus far I have described the construction of the typical speedometer.

The invention is applied thereto by securing a reflecting plate 16 on the face of the dial 11. This plate may consist of polished metal or of a glass mirror suitably attached to the dial face. A ring band 17 is positioned about the flange 12. The band 17 is provided with two bracket arms 18 and 19.

The arm 18 supports a photo-electric cell housing 20 from which a light shielding tube 21 projects. The housing 20 is designed to receive a photoelectric cell 22. The tube 21 is directed toward the reflecting plate 16. The arm 19 supports a lamp socket 23 carrying a suitable light bulb 24. The bulb 24 is surrounded by a lamp housing 25 having a slot or light gate 26.

The bracket arm 19 is designed to support the bulb 24 over the axis of the indicating hand 14 and the lamp housing and gate are positioned so as to direct the light beam against the reflecting plate 16 so that the latter will reflect it into the tube 21 and into the photoelectric cell 22.

Current is supplied to the lamp 24 through a suitable conductor 28 from the car battery, indicated at 29, the other side of the circuit being grounded through the bracket 19. The circuit to the photoelectric cell is conducted through suitable conductors 30 to an amplifying unit 31 which operates a relay to control any suitable signal device such as indicated at 32. Current for operating the system is supplied either by a battery 33 or a generator.

In use, the ring band 17 is rotated so as to position the tube 21 over the speed indication on the dial 15 where a signal is desired. The set screw 27 is then tightened to lock the ring band in place. The light beam is constantly projected from the lamp 24 to the reflecting surface at 16, thence to the photoelectric cell 22.

When the hand 14 reaches the predetermined indication, it will interrupt this light beam, causing the photoelectric cell to actuate the amplifier unit and through it, the signal device 32, thus giving an indication to the driver that the preset speed has been reached.

There is nothing to interfere with further advancement of the hand 14 if desired, and on its return it will give another indication of the preset speed.

The signal device 32 may consist of a light, a bell or other alarm, or it may be connected to the ignition circuit of the automobile so as to cut off the ignition at the indicated time to prevent overspeeding of the vehicle.

In Figs. 4 and 5, an alternate form of the invention is illustrated. This form does not employ the reflecting principle of the previously described form, and requires to be built into the speedometer. In this form a lamp 34 is positioned at one side of and in front of the speedometer dial. A photoelectric cell 35 is positioned diametrically opposite the lamp 34. The extremity of the indicating hand on the speedometer is turned outwardly as shown at 36 so as to provide a definite stop for the light beam at the point where the beam crosses to the photoelectric cell 35.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for giving a signal when the hand of an indicator reaches a predetermined point on its cooperating dial comprising: a reflecting surface positioned to the rear of said hand; a lamp positioned forward of said hand, to direct a beam of light angularly against the reflecting surface at the predetermined point; a photoelectric cell positioned to receive the beam from the reflecting surface so that the beam will be interrupted by the hand at the predetermined point; and a common supporting member for both said lamp and said photoelectric cell whereby both are held permanently in alignment with each other, said supporting member being adjustably mounted for movement around said dial to any desired position.

2. A photo-electric indicating device for speedometers, of the type having a stationary dial and a speed indicating hand pivoted at the mid-point of said dial, comprising: an annular frame member; means for securing said frame member about said dial; a reflecting plate; means for fixedly securing said plate on the face of said dial between the latter and said hand and about the pivot point of the latter; a light source; a bracket member extending from said frame and supporting said light source in alignment with the axis of said hand at an angle to project its beam radially inward towards said plate at an acute angle; a photo-electric cell; and means for supporting said cell from said frame in the path of the beam as reflected from said plate.

3. A photo-electric indicating device for speedometers, of the type having a stationary dial and a speed indicating hand pivoted at the mid-point of said dial, comprising: an annular frame member; means for securing said frame member about said dial; a reflecting plate; means for fixedly securing said plate on the face of said dial between the latter and said hand and about the pivot point of the latter; a light source; a bracket member extending from said frame and supporting said light source at the axis of said hand; means for directing a beam of light from said source radially outward from said axis and across and against the face of said reflecting plate; a photo-electric cell; means for supporting said cell from said frame in the path of the beam as reflected from said plate, said frame being rotatable about said dial, the light source being rotatably maintained over the pivot point during rotation; and means for locking said frame at any desired circumferential position.

4. A photo-electric indicating device for speedometers, of the type having an indicating hand pivotally mounted over a dial, comprising: a light source; means for supporting said light source in alignment with the axis of said hand so that it will project a radial beam of light from said axis at a rearward angle toward said dial; a reflecting surface on said dial about the axis of said hand to reflect said beam radially outward; a photo-electric cell; and means for supporting said cell in alignment with the reflected beam.

5. A photo-electric speed limit indicator, for speedometers of the type having a stationary circular dial and an indicating hand pivoted at the mid-point of said dial, comprising: an annular ring member rotatably and concentrically surrounding the periphery of said dial; a light source for projecting a beam of light; means for fixedly supporting said light source from said ring member in a position in front of said dial and at an angle to project its beam rearwardly at an acute angle against said dial in the path of said hand and in a plane diametric with said dial so that said beam will be reflected forwardly and outwardly from said dial in said diametric plane; a photo-electric cell; and means for fixedly supporting said cell from said ring member in the path of the reflected ray.

6. A photo-electric speed limit indicator, for speedometers of the type having a stationary circular dial and an indicating hand pivoted at the mid-point of said dial, comprising: an annular ring member rotatably and concentrically surrounding the periphery of said dial; a light source for projecting a beam of light; means for fixedly supporting said light source from said ring member in a position in front of said dial and at an angle to project its beam rearwardly at an acute angle against said dial in the path of said hand and in a plane diametric with said dial so that said beam will be reflected forwardly and outwardly from said dial in said diametric plane; a photo-electric cell; means for fixedly supporting said cell from said ring member in the path of the reflected ray; and a reflecting surface affixed to said stationary dial in the annular path formed by said beam as said ring member is rotated.

7. A photo-electric speed limit indicator, for speedometers of the type having a stationary circular dial and an indicating hand pivoted at the mid-point of said dial, comprising: an annular ring member rotatably and concentrically surrounding the periphery of said dial; a light source for projecting a beam of light; means for fixedly supporting said light source from said ring member in a position in front of said dial so as to project a beam of light diametrically across said dial; a photo-electric cell; a photo-electric cell supported from said ring diametrically opposite said light source; a housing about said light source; and a shielding tube projecting from said housing to receive the diametric beam from said light source.

8. In a photo-electric indicating device having a beam of light and light producing means and comprising light beam operated indicator, a housing with a substantially flat circular dial and an associated indicating hand pivotally mounted with its axis at right angles to the dial to intercept said beam of light and thereby operate said indicator, a circular ring member movably mounted upon the housing concentric with the dial and provided with photo-electric cell means to receive a radial beam of light, light means carried by said ring member and providing said beam of light, said photo-electric cell means having a housing and daylight-excluding, light-beam-receiving means having a passage extending radially toward the axis of said hand to receive said beam of light, whereby the angular position of said beam of light may be adjusted by the position of the ring member and the position of said beam of light where it will be intercepted by said hand and thus operate said indicator, may be predetermined.

9. A photo-electric indicating device comprising a light beam operated indicator, a housing with a circular dial whose fingers are in substantially the same plane and an associated indicating hand pivotally mounted and co-operating with the dial, a circular ring member angularly movable upon the housing concentric with the dial and with its plane parallel to the plane of the dial, light means and photocell means, and means mounting the light means and the photocell means on said ring member along a diameter thereof to throw a beam of light, the interception of which will operate said indicator, said indicating hand co-operating with said beam of light to intercept it and thereby operate said indicator, when said hand approaches the plane through said axis and through said beam of light.

10. A photo-electric indicating device, in which an adjustable beam of light from a source of light to a photo-electric cell is intercepted by the indicating hand of said device when the hand reaches said beam of light and thereby operates an indicator, comprising a beam operated indicator, a housing having a dial and an indicating hand whose axis is at right angles to said dial, a movable ring member provided with a source of light and with a co-operating photo-electric cell, mounted on said housing concentric with said axis, whereby adjustment of the angular position of the ring member with respect to the dial will determine the angular position of the beam of light and the angular position of the indicating hand when it intercepts the beam of light and operates said indicator.

11. A photo-electric indicating device, in which an adjustable beam of light from a source of light to a photo-electric cell is intercepted by the indicating hand of said device when the hand reaches said beam of light and thereby operates an indicator, comprising a beam operated indicator, a dial and an associated indicating hand, and a ring member concentric with said dial and angularly movable with respect thereto and having a housed photo-electric cell having daylight-excluding, beam receiving means having a passage and a co-operating source of light carried thereby, said beam of light being positioned to light said dial in whatever angular position it is set and to be intercepted by said hand when said hand approaches the plane through said beam of light, whereby the angular setting of said ring member will predetermine the angular position of said hand when it intercepts said beam of light and operates said indicator.

12. A photo-electric indicating device comprising a beam operated indicator, a housing with a circular dial and an associated indicating hand pivotally mounted with its axis at right angles to the dial, a circular ring member movably mounted upon the housing concentric with the dial and whose plane is parallel to the plane of the dial, means including light means and photo-cell means mounted on a diameter of said ring member to throw a beam of light from the light means to the photo-cell means, and a housing for said photo-cell including light-excluding means having a passage extending from said housing along the beam of light to receive through its open end the light from said light means, whereby the photo-cell will be in increased darkness when the beam of light is shut off, and whereby the ring member may be set with the beam of light in the same diametral plane with any desired figures on the dial, and the indicator hand will shut off the beam of light to said photo-cell when the hand reaches the dial figure to which the beam of light of the ring member has been set, and thereby operate said indicator.

FREDRICK W. BLETHEN.